United States Patent [19]

Piatt

[11] 4,037,889

[45] July 26, 1977

[54] JOURNAL BEARING

[76] Inventor: James A. Piatt, 1337 Woodfield Ave., South Bend, Ind. 46615

[21] Appl. No.: 696,038

[22] Filed: June 14, 1976

[51] Int. Cl.² ............................................. F16C 1/24
[52] U.S. Cl. .................................... 308/121; 308/240
[58] Field of Search .................. 308/37, 62, 106, 121, 308/240, 36

[56] References Cited

U.S. PATENT DOCUMENTS

| 2,926,972 | 3/1960 | Burrell | 308/121 |
| 3,300,259 | 1/1967 | Howard | 308/240 |
| 3,625,580 | 12/1971 | DeHart | 308/240 |

Primary Examiner—Joseph F. Peters, Jr.
Assistant Examiner—Gene A. Church
Attorney, Agent, or Firm—Oltsch & Knoblock

[57] ABSTRACT

A bearing having a sleeve-like support member with a bore therethrough which receives a rotatable shaft. The sidewall of the support member bore is formed into an annular shaft load carrying part and an annular shaft control part which is offset radially from the load bearing part by a shoulder.

9 Claims, 6 Drawing Figures

JOURNAL BEARING

SUMMARY OF THE INVENTION

This invention relates to an improved journal bearing and has specific but not limited application to a bearing having a length which is less than one-half its inside diameter.

In the bearing of this invention a support member is formed with a bore which receives the rotatable shaft. The sidewall of the support member bore is formed by a load carrying part and a shaft control part which is offset radially from the load bearing part by a shoulder. The load carrying part of the bore sidewall includes a segment which directly bears the shaft load. The control part of the bore sidewall includes a segment which is located generally oppositely across the bore from the segment of the load carrying part of the bore sidewall which bears the shaft load. This segment of the control part of the bearing is for restricting lateral movement of the shaft within the bearing bore so as to control the location of the shaft. Through the use of radially offset or eccentric bore sidewall parts sufficient radial clearance between the rotatable shaft and load carrying part of the bearing can be designed so as to provide an increased load bearing capacity for the bearing while maintaining shaft control through the use of the close fitting control part of the bearing.

Accordingly, it is an object of this invention to provide a journal bearing having a high load capacity and accurate shaft location.

Another object of this invention is to provide a journal bearing having a high load capacity with accurate shaft location for a bearing length to bore diameter ratio of less than 1 to 2.

Other objects of this invention can become apparent upon a reading of the invention's description.

DESCRIPTION OF THE PREFERRED EMBODIMENTS

The preferred embodiments illustrated are not intended to be exhaustive or to limit the invention to precise forms disclosed. They are chosen and described in order to best explain the principles of the invention and its application and practical use to thereby enable others skilled in the art to best utilize the invention.

Figure 1:
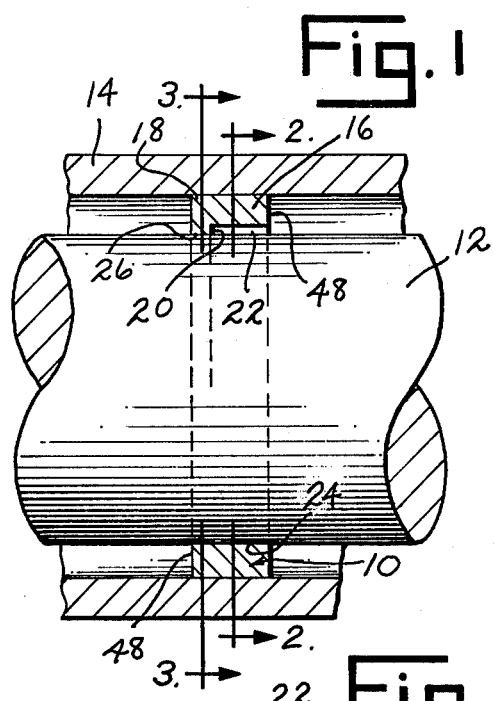
FIG. 1 is a longitudinal sectional view of one embodiment of this invention.
Figure 2:
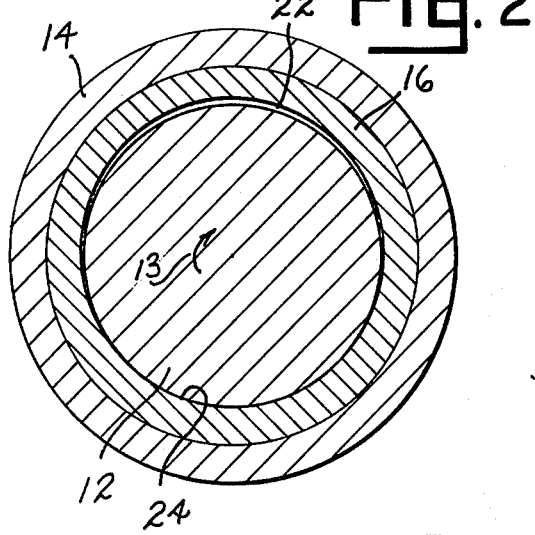
FIG. 2 is a cross sectional view taken along line 2—2 of FIG. 1.
Figure 3:
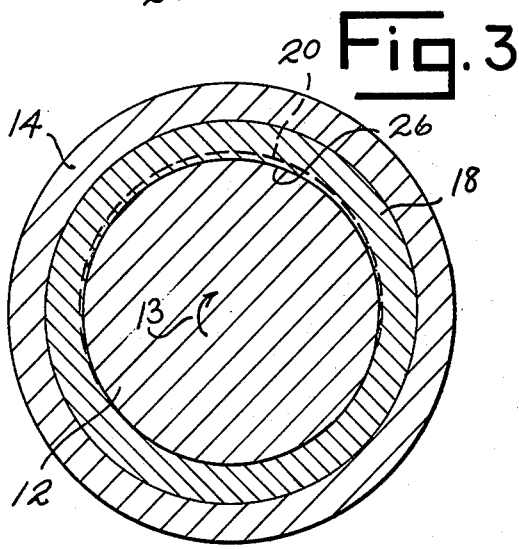
FIG. 3 is a cross sectional view taken along line 3—3 of FIG. 1.

In the embodiment of this invention shown in FIG. 1—3, the bearing includes a support member 10 which is sleevelike in form and whose bore receives a shaft 12 shown rotating in the direction of arrow 13. Support member 10 is retained against movement by being secured to an exterior housing 14. The means of securing support member 10 to housing 14 may vary. In some applications of the bearing an interference fit between the support member and housing will be sufficient to secure the support member to the housing while in other applications lock rings or set screws could be utilized to accomplish the same purpose. Support member 10 is formed of a metallic material whose composition will vary depending upon the intended use of the bearing.

The bore sidewall of support member 10 includes a circular shaft load bearing part 16 and a circular shaft control part 18 which is offset radially, so as to be eccentric, from load carrying part 16 by a shoulder 20. In comparing the clearance of shaft 12 within the support member bore, it will be noted that there is substantially more clearance between shaft load carrying part 16 (see FIG. 2) than there is between shaft control part 18 (see FIG. 3) of the bearing. During rotation of shaft 12 in the operation of the bearing of this invention, a suitable lubricant, such as oil, is introduced between support member 10 and the shaft. The diametrical clearance 22 between shaft 12 and load carrying part 16 is designed to be sufficient for the desired load carrying capabilities of the bearing to allow a hydrodynamic pressure of lubricant wedge to be formed along segment 24 of part 16. This lubricant wedge, as is well known in the lubricating art, serves to support shaft 12 and its load during operation of the bearing. The diametrical clearance between shaft 12 and control part 18 of support member 10 is minimal so as to restrict radial movement of the shaft relative to support member 10. Because of this minimal clearance, a suitable shaft-supporting lubricant wedge will generally not be formed between the shaft and control part 18. The lubricant wedge formed in the general area of load carrying part segment 24 will force shaft 12 upwardly where the shaft is restricted from further upward movement by segment 26 of control part 18.

Figure 4:
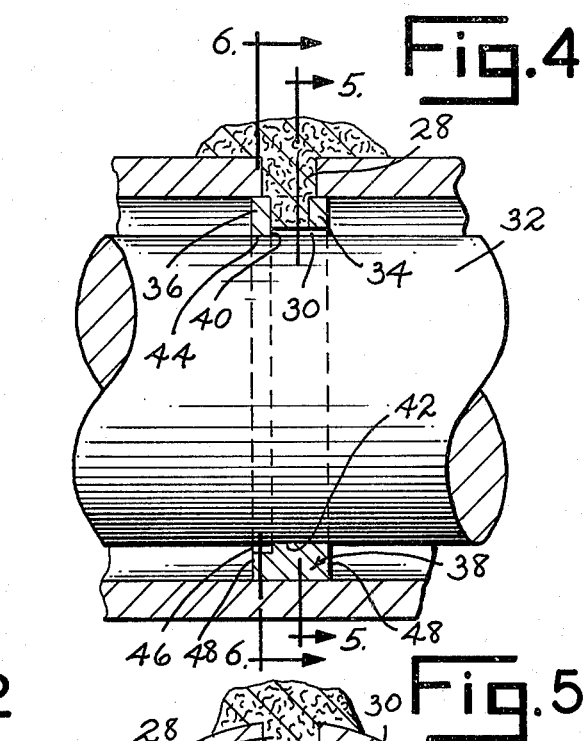
FIG. 4 is a longitudinal sectional view of another embodiment of this invention.
Figure 5:
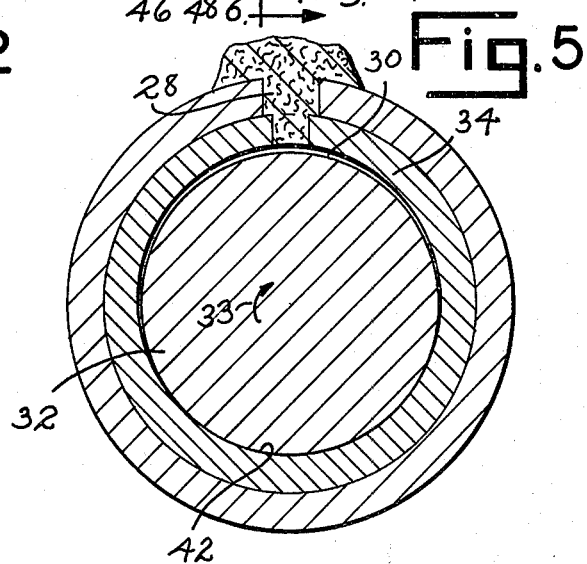
FIG. 5 is a cross sectional view taken along line 5—5 of FIG. 4.
Figure 6:
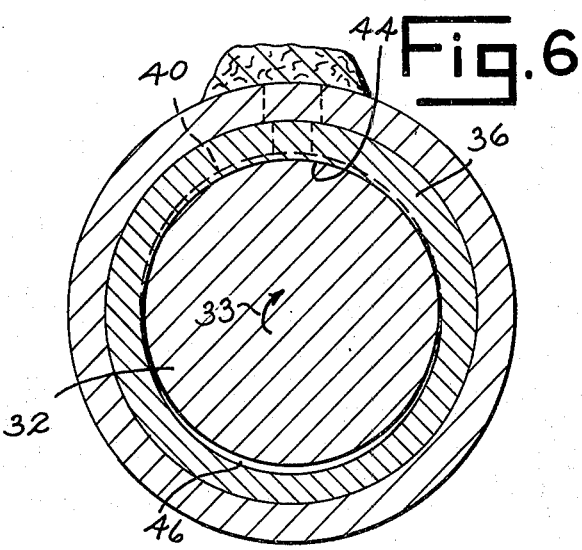
FIG. 6 is a cross sectional view taken along line 6—6 of FIG. 4.

In the embodiment of this invention shown in FIGS. 4–6, the bearing is modified so as to include an oil wick 28 which serves to feed the lubricant into space 30 created by the clearance between shaft 32 shown rotating in the direction of arrow 33 and circular shaft load carrying part 34 and into the slight spacing between the shaft and circular shaft control part 36 of support member 38. Control part 36 is offset radially from load carrying part 34 by a shoulder 40. A hydrodynamic pressure or lubricating wedge will be formed in the general area of the load bearing segment 42 of load carrying part 34. This lubricating wedge will force shaft 32 upwardly where further upward movement of the shaft is restricted by segment 44 of control part 36 of the bearing.

Other than lubricating wick 28 which could be incorporated in either of the embodiments shown in the description of this invention, the bearing depicted in FIGS. 1–3 is similar to that shown for the bearing depicted in FIGS. 4–6 except for the size and location of the shaft control parts 18 and 36. In the bearing of FIGS. 1–3 it will be observed that the bottom of load carrying part 16 which includes load bearing segment 24 and the bottom of control segment 18 are colinear. In the embodiment of the bearing of FIGS. 4–6, the bottom of control part 36 extends below the bottom of load carrying part 34 which includes load bearing segment 42 as will be observed by space 46 in FIG. 6. Generally the shaft control part of the bearing of this invention will be narrower than the shaft load carrying part of the bearing, although this relationship can vary depending upon use, peak loads, safety and other operating conditions of the bearing. Additionally, the shaft load carrying and control parts of the bearing need not be circular. The configuration of such parts may be elliptical, oval, or some other suitable shape so long as a lubricating wedge can be formed between the shaft and the load carrying part of the bearing and a generally oppositely located portion of the control part of the bearing can be utilized to locate the shaft within the bearing. The bearing of this invention may also be designed for a high load capacity with the length of the bearing as measured between end faces 48 of support members 10 and 38 being less than one-half of the maximum transverse dimensions of the shaft load carrying parts 16 and 34 and shaft control parts 18 and 36.

It is to be understood that the invention is not to be limited to the details above given but may be modified within the scope of the appended claims.

What I claim is:

1. A bearing comprising a support member having a bore therethrough to receive a rotatable shaft, said bore having a side wall formed by a shaft load carrying part and a shaft control part offset radially and longitudinally from said load carrying part by a shoulder, said load carrying part including segment means for bearing the load of said shaft, said control part including segment means separated from said load carrying part by said shoulder and located generally oppositely of the segment means of the load carrying part for restricting lateral movement of said shaft within said bore.

2. The bearing of claim 1 wherein said control part includes a surface section colinear with the segment means of said load carrying part.

3. The bearing of claim 1 wherein said bore wall includes a single load carrying part and a single control part.

4. The bearing of claim 1 wherein said support member includes first and second end faces, the length of said bearing as measured between end faces being less than one-half the diameter of said bore as defined by the maximum transverse dimension of said load carrying and control parts.

5. The bearing of claim 1 wherein said control part is radially offset by said shoulder from the segment means of said load carrying part.

6. In combination a shaft and bearing, said bearing including a support member having a bore therethrough, said shaft being rotatably received within said bore, said bore having a side wall defined by a shaft load carrying part and a shaft control part offset radially and longitudinally from said load carrying part by a shoulder, said load carrying part including segment means for bearing the load of said shaft during rotation of the shaft, said control part including segment means separated from said load carrying part by said shoulder and located generally oppositely of the segment means of said load carrying part for restricting lateral movement of said shaft within said bore.

7. The combination bearing and shaft of claim 6 wherein said load carrying part and control part are colinear at the segment means of said load carrying part.

8. The combination bearing and shaft of claim 6 wherein said control part is offset from said load carrying part adjacent the segment means of the load carrying part.

9. The combination bearing and shaft of claim 8 wherein said control part extends radially beyond said load carrying part at the segment means of the load carrying part.

* * * * *